United States Patent
Wan

(10) Patent No.: US 11,552,503 B2
(45) Date of Patent: Jan. 10, 2023

(54) TERMINAL DEVICE AND CHARGING CONTROL METHOD

(71) Applicant: GUANGDONG OPPO MOBILE TELECOMMUNICATIONS CORP., LTD., Guangdong (CN)

(72) Inventor: Shiming Wan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 148 days.

(21) Appl. No.: 16/985,751

(22) Filed: Aug. 5, 2020

(65) Prior Publication Data
US 2020/0366134 A1    Nov. 19, 2020

Related U.S. Application Data

(63) Continuation of application No. PCT/CN2018/084389, filed on Apr. 25, 2018.

(51) Int. Cl.
*H02J 50/12* (2016.01)
*H02J 50/80* (2016.01)
(Continued)

(52) U.S. Cl.
CPC ............ *H02J 50/12* (2016.02); *H02J 7/0045* (2013.01); *H02J 7/04* (2013.01); *H02J 50/80* (2016.02); *H02J 2207/20* (2020.01)

(58) Field of Classification Search
CPC ...................................................... H02J 7/342
(Continued)

(56) References Cited

U.S. PATENT DOCUMENTS

2007/0103110 A1*  5/2007  Sagoo .................... H02J 50/40
                                                           320/109
2011/0156655 A1*  6/2011  Kim ...................... H02J 7/0031
                                                           320/134
(Continued)

FOREIGN PATENT DOCUMENTS

CN    103326406 A    9/2013
CN    104218691 A    12/2014
(Continued)

OTHER PUBLICATIONS

Indian Examination Report for IN Application 202017036485 dated Jul. 26, 2021. (5 pages).
(Continued)

*Primary Examiner* — Edward Tso
*Assistant Examiner* — Ahmed H Omar
(74) *Attorney, Agent, or Firm* — Young Basile Hanlon & MacFarlane, P.C.

(57) ABSTRACT

The present disclosure provides a terminal device and a charging control method. The terminal device includes a receiving coil, a wireless charging module, an inverter circuit and a transmitting coil. The receiving coil is configured to receive a wireless charging signal. The wireless charging module is configured to perform a wireless charging to a battery based on the wireless charging signal received by the receiving coil. The inverter circuit is configured to generate an alternating current signal based on a power supply voltage provided by the battery. The transmitting coil is configured to transmit a wireless charging signal to the outside based on the alternating current signal.

14 Claims, 3 Drawing Sheets

(51) Int. Cl.
*H02J 7/00* (2006.01)
*H02J 7/04* (2006.01)

(58) Field of Classification Search
USPC .......................................................... 320/103
See application file for complete search history.

(56) References Cited

U.S. PATENT DOCUMENTS

| | | | |
|---|---|---|---|
| 2016/0006267 A1* | 1/2016 | Muratov | H02J 7/007 307/104 |
| 2016/0064962 A1 | 3/2016 | Huang et al. | |
| 2016/0204620 A1* | 7/2016 | Cho | H02J 7/0042 307/104 |
| 2017/0054328 A1* | 2/2017 | Jung | H02J 50/12 |
| 2017/0237276 A1* | 8/2017 | Onishi | H02J 50/90 320/108 |
| 2018/0041060 A1* | 2/2018 | Walley | H02J 7/00 |

FOREIGN PATENT DOCUMENTS

| | | |
|---|---|---|
| CN | 107508362 A | 12/2017 |
| CN | 107707000 A | 2/2018 |
| EP | 3133746 A1 | 2/2017 |
| WO | 2014167171 A1 | 10/2014 |

OTHER PUBLICATIONS

Extended European Search Report for EP Application 18916603.6 dated Jan. 15, 2021.
English translation of ISR for PCT application PCT/CN2018/084389 dated Jan. 30, 2019.

* cited by examiner

TERMINAL DEVICE AND CHARGING CONTROL METHOD

CROSS-REFERENCE TO RELATED APPLICATION(S)

This application is a continuation application of International Application No. PCT/CN2018/084389, filed on Apr. 25, 2018, the entire contents of which are incorporated herein by reference.

TECHNICAL FIELD

The present disclosure relates to a field of wireless charging, and more particularly, to a terminal device and a charging control method.

BACKGROUND

With the popularity of wireless charging technologies, more and more terminal devices (such as mobile phones) support wireless charging.

At present, wireless charging of terminal devices usually needs a wireless charging base. Since it is troublesome to carry the wireless charging base, the wireless charging process is not flexible enough.

SUMMARY

In a first aspect, a terminal device is provided. The terminal device includes: a receiving coil, configured to receive a wireless charging signal; a wireless charging module, configured to perform a wireless charging to a battery based on the wireless charging signal received by the receiving coil; an inverter circuit, configured to generate an alternating current signal based on a power supply voltage provided by the battery; and a transmitting coil, configured to transmit a wireless charging signal to the outside based on the alternating current signal.

In a second aspect, a charging control method is provided. The charging control method includes: receiving a wireless charging signal; performing a wireless charging to a battery in a terminal device based on the wireless charging signal received; generating an alternating current signal based on a power supply voltage provided by the battery; and transmitting a wireless charging signal to the outside based on the alternating current signal.

DETAILED DESCRIPTION

The terminal device mentioned in embodiments of the present disclosure includes, but is not limited to: a device configured to receive/transmit a communication signal via a wired line connection (such as a public switched telephone network (PSTN), a digital subscriber line (DSL), a digital cable, a direct cable connection, and/or another data connection/network) and/or via a wireless interface (of, for example, a cellular network, a wireless local area network (WLAN), a digital TV network such as a digital video broadcasting handheld (DVB-H), a satellite network, an amplitude modulation-frequency modulation (AM-FM) broadcast transmitter, and/or another communication terminal). A terminal configured to communicate through a wireless interface may be referred to as a "wireless communication terminal", a "wireless terminal", and/or a "mobile terminal". Examples of mobile terminals include, but are not limited to, a satellite or a cellular phone; a personal communication system (PCS) terminal that may combine a cellular radiotelephone with capabilities such as data processing, facsimile and data communications; a personal digital assistant (PDA) that may include a radiotelephone, a pager, an Internet/intranet access, a web browser, a notepad, a calendar, and/or a global positioning system (GPS) receiver; and a conventional laptop and/or palmtop receiver, or other electronic devices including a radiotelephone transceiver. In some embodiments, the terminal device mentioned in embodiments of the present disclosure may refer to a mobile terminal device or a handheld terminal device, such as a mobile phone, a pad, or the like. In some embodiments, the terminal device mentioned in embodiments of the present disclosure may be a chip system, and in these embodiments, the battery of the terminal device may or may not belong to the chip system.

Generally, a traditional terminal device only serves as a receiving end of wireless charging, and receives wireless charging signals (such as wireless charging signals transmitted by an external wireless charging base), for charging a battery inside the terminal device. It is troublesome to carry the wireless charging base, resulting in insufficient flexibility in the wireless charging process.

To solve the above problems, embodiments of the present disclosure provide a terminal device. The terminal device according to embodiments of the present disclosure will be described in detail below with reference to FIG. 1.

Figure 1:
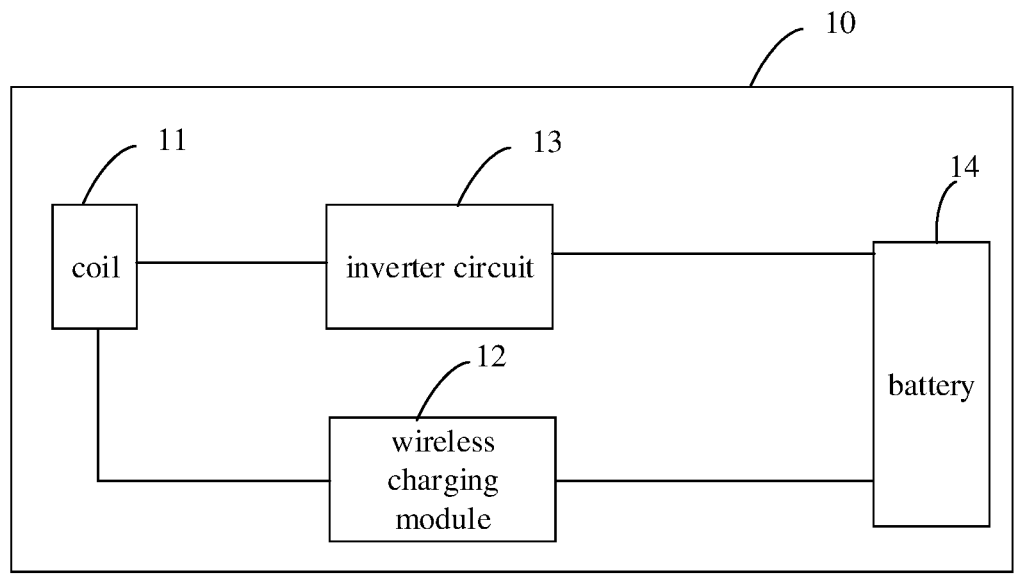
FIG. 1 is a schematic block diagram of a terminal device according to an embodiment of the present disclosure.

As illustrated in FIG. 1, the terminal device 10 according to embodiments of the present disclosure may include a coil 11, a wireless charging module 12, an inverter circuit 13, and a battery 14.

The coil 11 may include a receiving coil. The receiving coil may be configured to receive a wireless charging signal (such as a wireless charging signal transmitted by an external wireless charging apparatus). The receiving coil is sometimes referred to as a receiving antenna.

The wireless charging module 12 may be configured to perform a wireless charging to the battery 14 based on the wireless charging signal received by the receiving coil. The wireless charging module 12 may, for example, include a wireless receiving circuit. The wireless receiving circuit may be electrically connected to the receiving coil. The wireless receiving circuit may include a shaping circuit such as a rectifier circuit and/or a filter circuit. The wireless receiving circuit may be configured to convert an alternating current output by the receiving coil into a direct current voltage as an output voltage of the wireless charging module 12, such that the wireless charging module 12 may charge the battery 14 with the direct current voltage. The output voltage of the wireless charging module 12 may be directly loaded across the battery 14, or may be loaded across the battery 14 after being converted by other elements (such as a charging IC).

The inverter circuit 13 may be configured to generate an alternating current signal based on a power supply voltage provided by the battery 14. The alternating current signal may be an alternating current signal suitable for wireless transmission, such as a high-frequency alternating current signal.

In embodiments of the present disclosure, the form of the inverter circuit 13 is not specifically limited. An inverter circuit may be used in embodiments of the present disclosure as long as the inverter circuit is capable of converting a direct current signal into an alternating current signal. For example, the inverter circuit 13 may be a bridge inverter circuit (such as a full-bridge inverter circuit or a half-bridge inverter circuit), or may be another type of inverter circuit, where the bridge inverter circuit may sometimes be referred to as an inverse bridge rectifier circuit.

Take the inverter circuit 13 being a full-bridge inverter circuit composed of four switch tubes as an example. By controlling an on-off sequence and frequency of the four switch tubes, the power supply voltage received at an input end of the inverter circuit 13 may be converted into an alternating current signal suitable for wireless transmission. There may be various methods to control the inverter circuit 13. For example, the inverter circuit 13 may be integrated with an independent controller; or, the wireless charging module 12 may implement the function of controlling the inverter circuit 13, which is not limited in embodiments of the present disclosure.

The coil 11 may also include a transmitting coil. The transmitting coil may be configured to transmit a wireless charging signal to the outside based on the alternating current signal output by the inverter circuit 13. For example, a capacitor C may be provided between the inverter circuit 13 and the transmitting coil, so that the capacitor C and the transmitting coil form an LC oscillation circuit, thereby converting the alternating current signal into the wireless charging signal (electromagnetic wave) for transmission.

As noted above, the coil 11 may include the receiving coil and the transmitting coil. The receiving coil and the transmitting coil may be two coils that are independent of each other, or may be the same coil (that is, the same coil is used for sending and receiving wireless charging signals), which are not limited in embodiments of the present disclosure. The receiving coil and the transmitting coil sharing the same coil may simplify the internal structure of the terminal device. The following description is made by taking an example that the coil 11 is used for both transmitting and receiving wireless charging signals.

The terminal device according to embodiments of the present disclosure may be used as a wireless receiving end for receiving a wireless charging signal, and may also be used as a wireless transmitting end for transmitting a wireless charging signal to the outside. In this manner, terminal devices may wirelessly charge each other, thereby improving the flexibility of wireless charging.

As mentioned above, the inverter circuit 13 may generate the alternating current signal based on the power supply voltage provided by the battery 14. However, in embodiments of the present disclosure, the manner in which the battery 14 supplies the power supply voltage to the inverter circuit 13 is not specifically limited. For example, the internal structure of the terminal device 10 may be modified, such that a power supply path specially configured for the inverter circuit 13 may be designed between the battery 14 and the inverter circuit 13; or, the inverter circuit 13 may also share the power supply path with other elements or functional modules, that is, multiplexing the power supply path of other elements or functional modules. The following provides a design solution of the power supply path having an On-The-Go (OTG) function based on the universal serial bus (USB) protocol in combination with FIG. 2. The design solution may multiplex the power supply path having the OTG function.

For a better understanding, a brief introduction to OTG technology is provided. A traditional USB device needs to be connected to a host machine (such as a personal computer) to implement data transmission or communication between the host machine and the USB device or between USB devices. In the absence of a host machine, data transmission or communication is impossible between USB devices (such as between mobile phones or between a mobile phone and a USB disk). In order to solve this problem, the USB OTG standard provides the OTG function for USB devices on the basis of the USB2.0 standard, and aims to implement data transmission or communication between USB devices without the help of a host machine. In detail, OTG technology introduces a power management function for USB devices, allowing a certain USB device to act as a host machine for providing the power supply voltage (i.e., VBUS) for other USB devices (the other devices may be called USB OTG devices, which are equivalent to peripherals of the USB device as a host machine). A USB interface of a USB device that supports the OTG function may be called a USB OTG interface.

Optionally, in some embodiments, the terminal device 10 may provide the power supply voltage to the inverter circuit 13 with the help of the OTG power supply path provided by the OTG technology, which will be described in detail below in combination with FIG. 2.

Figure 2:
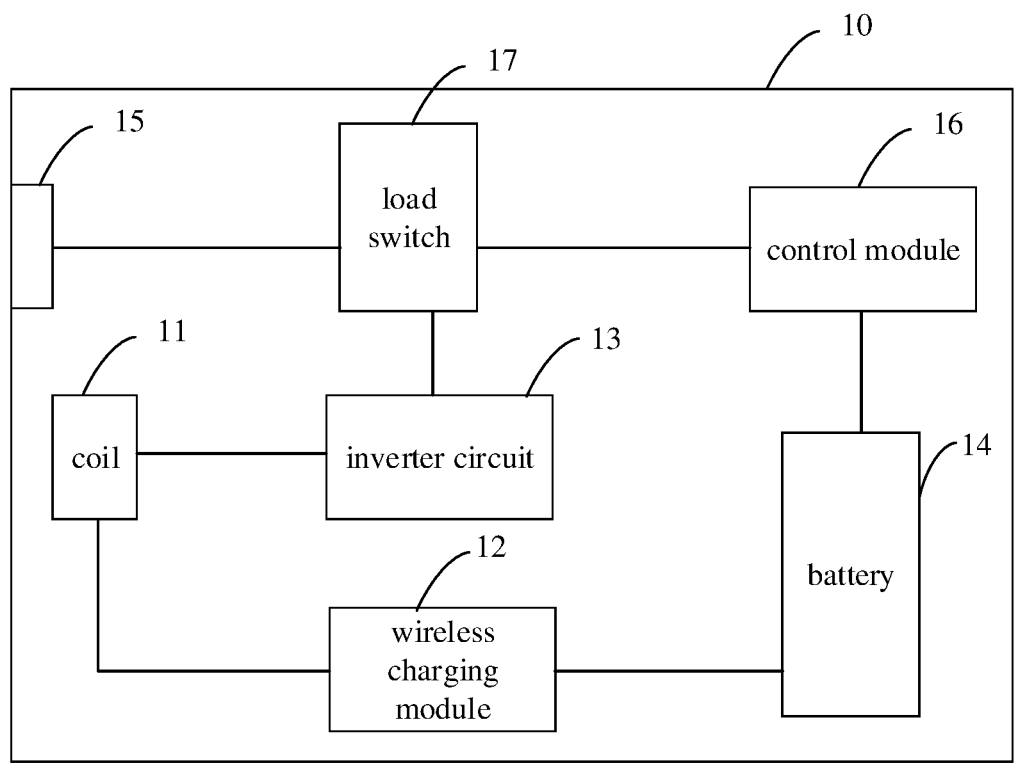
FIG. 2 is a schematic block diagram of a terminal device according to another embodiment of the present disclosure.

As illustrated in FIG. 2, the terminal device 10 may further include a USB OTG interface 15 and a control module 16. The control module 16 is a control module with an OTG function. The control module 16 may be configured to control the battery 14 to provide the power supply voltage to an external USB OTG device through the USB OTG interface 15. In addition, the control module 16 may also be configured to control the battery 14 to provide the power supply voltage to the inverter circuit 13.

In detail, as illustrated in FIG. 2, one end of the control module 16 may be electrically connected to the battery 14, and the other end may be electrically connected to the USB OTG interface 15 and the inverter circuit 13 through a load switch 17 (a bidirectional load switch). The control module 16 may control the battery 14 to provide the power supply voltage for the USB OTG device or the inverter circuit 13 through the load switch 17.

In other words, embodiments of the present disclosure change the traditional OTG power supply path, so that the traditional OTG power supply path has the function of providing the power supply voltage for the inverter circuit. Consequently, the terminal device has a wireless transmission function. The implementation of the wireless transmission function based on the OTG technology multiplexes some circuits or functions of the traditional OTG power supply path, and thus has the advantages of low cost and easy implementation.

Optionally, in some implementations, the control module 16 may be further configured to: before controlling the battery 14 to provide the power supply voltage for the inverter circuit 13, determine whether a USB OTG device is connected to the USB OTG interface 15; and in response to determining that a USB OTG device is connected to the USB OTG interface 15, control the terminal device 10 to generate prompt information for prompting a user to disconnect the USB OTG device from the USB OTG interface.

The above prompt information may be, for example, text information, an indicator signal, or an alarm signal, which is not limited in embodiments of the present disclosure. Sending the prompt information to the user may improve the security and user experience of terminal devices. Of course, in some embodiments, once the instruction to enable the wireless transmission function is received, instead of performing the above detection, the OTG power path is directly provided to the inverter circuit 13 through the load switch.

The control module 16 may be implemented in various ways. For example, the control module 16 may be an independent control module, such as an independent USB controller, or may be integrated in other elements inside the terminal device 10, for example, integrated in a charging IC inside the terminal device 10. The charging IC integrated with the control function of the control module 16 may be referred to as a charging IC with the OTG function. The following mainly uses such an implementation as an example.

The process in which the charging IC controls the battery 14 to supply the power supply voltage to the inverter circuit 13 may include followings. In response to receiving the instruction of enabling the wireless transmission function of the terminal device, the charging IC receives and boosts the voltage of the battery 14 (if the voltage of the battery 14 meets requirements of the power supply voltage of the wireless transmission function, the voltage may not be boosted.), and transmits the voltage boosted to the inverter circuit 13 by using the voltage boosted as the power supply voltage of the inverter circuit 13.

Optionally, in some embodiments, the charging IC may further be configured to receive a charging signal from the USB OTG interface 15, and to perform constant voltage and/or constant current control on the charging signal to generate the charging voltage of the battery 14. In this manner, the terminal device 10 may be compatible with traditional USB charging solutions.

Optionally, in some embodiments, the charging IC may further be configured to receive an output voltage of the wireless charging module 12, and to perform constant voltage and/or constant current control on the output voltage of the wireless charging module 12 to generate the charging voltage of the battery 14. In this way, the terminal device 10 may be compatible with traditional wireless charging solutions.

The charging IC is limited by a low circuit conversion efficiency, so that the unconverted electrical energy is lost in the form of heat. This part of heat gathers inside the terminal device 10. Since the design space and heat dissipation space in the terminal device 10 are very small (for example, the physical size of the mobile terminal used by the user is getting thinner and lighter, and a large number of electronic components are densely arranged in the mobile terminal to improve the performance of the mobile terminal), the design difficulty of the charging IC is increased, and the heat gathered in the terminal device 10 is difficult to be removed in time, thereby causing abnormality of the terminal device 10.

For example, the heat accumulated on the charging IC may cause thermal interference to electronic components near the charging IC, resulting in abnormal operations of the electronic components. As another example, the heat accumulated on the charging IC may shorten the service life of the charging IC and nearby electronic components. As another example, the heat accumulated on the charging IC may cause thermal interference to the battery, which may lead to abnormal battery charging and discharging. As another example, the heat accumulated on the charging IC may bring a temperature rise of the terminal device 10, which affects the user experience during charging. As another example, the heat accumulated on the charging IC may cause the charging IC to short-circuit, such that an abnormal charging may occur as the output voltage of the wireless charging module 12 is directly loaded on both ends of the battery. When the battery is in an overvoltage charging state for a long time, an explosion of the battery is likely to happen, which endangers the safety of users.

Figure 3:
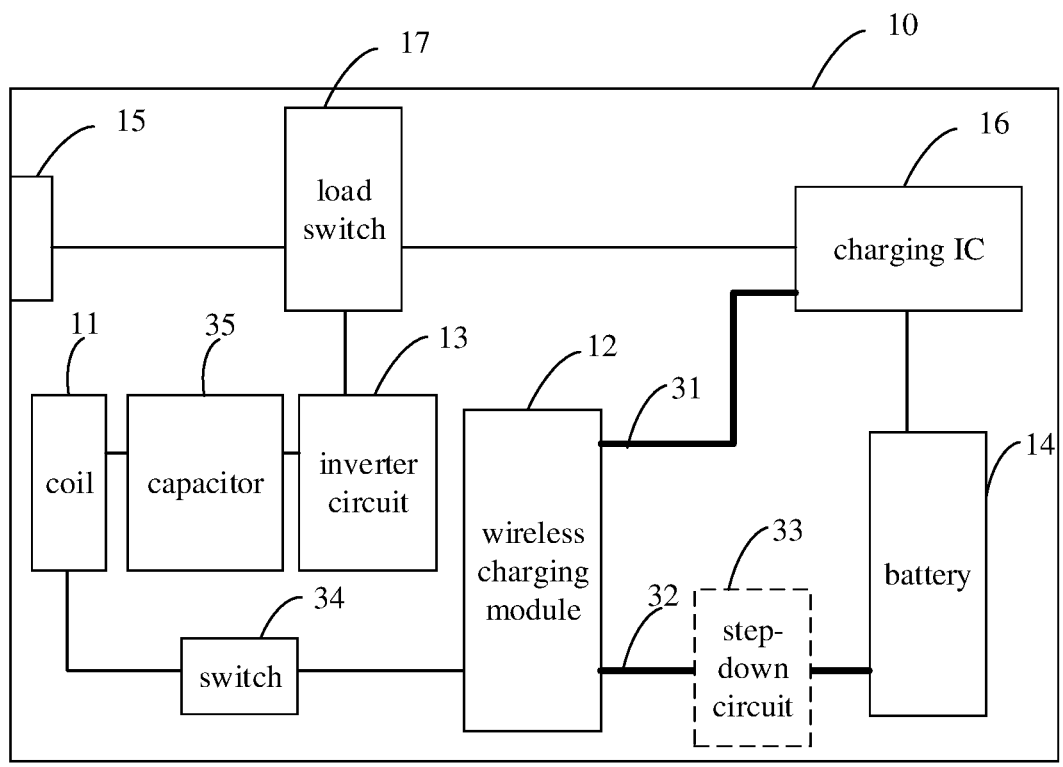
FIG. 3 is a schematic block diagram of a terminal device according to yet another embodiment of the present disclosure.

Embodiments of the present disclosure further provide a terminal device, which may reduce heat generation of the terminal device. Detailed description will be made below with reference to FIG. 3. As illustrated in FIG. 3, the wireless charging channel where the charging IC 16 is located may be referred to as a first wireless charging channel 31 (which may also be referred to as an ordinary wireless charging channel), and a second wireless charging channel 32 (which may also be referred to as fast wireless charging channel) may be introduced on the basis of the first wireless charging channel 31.

The terminal device 10 may further include a detection circuit (not shown). The detection circuit may be configured to detect an output voltage and/or output current of the second wireless charging channel 32. The wireless charging module 12 may be configured to perform a wireless communication with a wireless charging apparatus based on the output voltage and/or the output current of the second wireless charging channel 32 detected by the detection circuit to adjust a transmitting power of the wireless charging apparatus, such that the output voltage and/or output current of the second wireless charging channel 32 matches a charging voltage and/or a charging current presently required by the battery.

In this manner, in the terminal device 10, the output voltage and/or the output current of the wireless charging module 12 may be directly loaded on both ends of the battery to charge the battery 14 (hereinafter, such a charging method is referred to as direct charging), thereby avoiding problems such as energy loss and heat generation caused by the conversion of the output voltage and/or the output current of the wireless charging module performed by the charging IC 16.

After solving the problem of heat generation of the charging IC 16, main heat sources of the terminal device 10 are concentrated in the coil 11 and the wireless charging module 12.

Take the charging power being 20 W and the charging voltage/charging current of a single cell being 5V/4 A as an example. As a possible implementation, assume that the wireless charging apparatus at the transmitting end generates a wireless charging signal based on 5V/4 A. Correspondingly, the wireless charging module 12 inside the terminal device 10 converts the wireless charging signal into an output voltage/output current of 5V/4 A. This kind of charging method based on low voltage and large current will generate a lot of heat in the wireless charging process.

In order to reduce the heat generated during the wireless charging process, embodiments of the present disclosure further improve the above-mentioned direct charging. A step-down circuit 33 is provided on the second wireless charging channel 32, and an output voltage of the step-down circuit 33 is used as the charging voltage of the battery. Still take the charging power being 20 W and the charging voltage/charging current of a single cell being 5V/4 A as an example. In order to meet requirements of the charging voltage of the battery 14, the output voltage/output current of the step-down circuit 33 needs to be maintained at 5V/4 A. Assuming that the step-down circuit 33 is a half-voltage circuit, the voltage before step-down is 10V/2 A. In this manner, the external wireless charging apparatus generates a wireless charging signal based on 10V/2 A, and accordingly, the wireless charging module 12 may convert the wireless charging signal into an output voltage/output current of 10V/2 A. Since the current is reduced from 4 A to 2 A, the heat generated during power transmission will be reduced accordingly.

The control function of the wireless charging module 12 may be implemented by, for example, a micro control unit (MCU), or may be implemented by an MCU together with an application processor (AP) in the terminal device.

The step-down circuit 33 may be configured to receive the output voltage of the wireless charging module 12, and to step down the output voltage of the wireless charging module 12 to obtain the output voltage and the output current of the step-down circuit 33, and to charge the battery based on the output voltage and the output current of the step-down circuit 33.

There may be various implementations of the step-down circuit 33. As an example, the step-down circuit 33 may be a Buck circuit. As another example, the voltage step-down circuit 33 may be a charge pump.

The introduction of the step-down circuit 33 keeps the voltage (such as the output voltage of the wireless charging module 12) generated during the wireless transmission at a high voltage, thereby further reducing the heat generation of the system.

Optionally, in some embodiments, as illustrated in FIG. 3, the terminal device 10 may further include a switch 34 and/or a capacitor 35. The switch 34 may be configured to control the wireless charging module 12 to disable the wireless receiving function. For example, when the terminal device 10 enters a wireless transmission mode, the switch 34 may be controlled to be turned off to disable the wireless receiving function. The capacitor 35 may be configured to form an LC oscillation circuit together with the coil 11 to implement the function of transmitting a wireless charging signal to the outside.

Device embodiments of the present disclosure are described in detail above with reference to FIGS. 1 to 3, and method embodiments of the present disclosure will be described in detail below with reference to FIGS. 4 to 5. The method embodiments and the device embodiments correspond to each other, and thus for parts that are not described in detail, reference may be made to the previous device embodiments.

Figure 4:
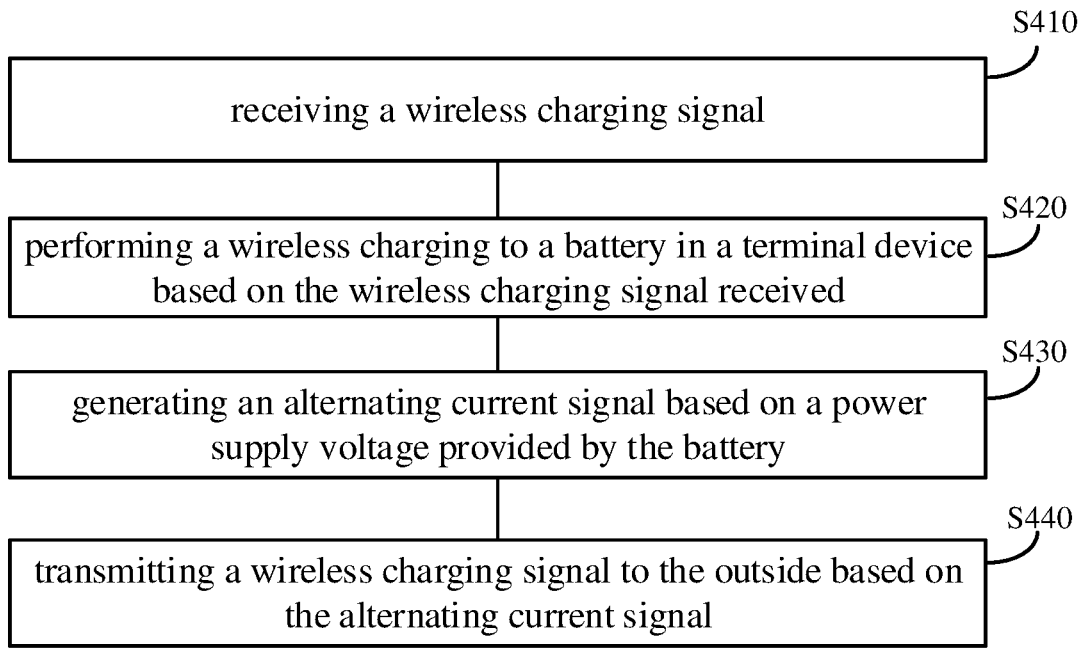
FIG. 4 is a schematic flowchart of a charging control method according to an embodiment of the present disclosure.

As illustrated in FIG. 4, the charging control method according to embodiments of the present disclosure may include blocks S410-S440.

At block S410, a wireless charging signal is received.

At block S420, a wireless charging is performed to a battery in a terminal device based on the wireless charging signal received.

At block S430, an alternating current signal is generated based on a power supply voltage provided by the battery.

At block S440, a wireless charging signal is transmitted to the outside based on the alternating current signal.

Optionally, the method provided by FIG. 4 may further include: controlling the battery to provide the power supply voltage to an external universal serial bus (USB) On-The-Go (OTG) device through a USB OTG interface of the terminal device; and/or controlling the battery to provide the power supply voltage to an inverter circuit.

Optionally, before controlling the battery to provide the power supply voltage for the inverter circuit, the method provided by FIG. 4 may further include: determining whether a USB OTG device is connected to the USB OTG interface; and in response to determining that a USB OTG device is connected to the USB OTG interface, controlling the terminal device to generate prompt information for prompting a user to disconnect the USB OTG device from the USB OTG interface.

Optionally, controlling the battery to provide the power supply voltage to the inverter circuit includes: in response to receiving an instruction of enabling a wireless transmission function of the terminal device, receiving a voltage of the battery; boosting the voltage of the battery; and transmitting the voltage boosted to the inverter circuit by using the voltage boosted as the power supply voltage of the inverter circuit.

Figure 5:
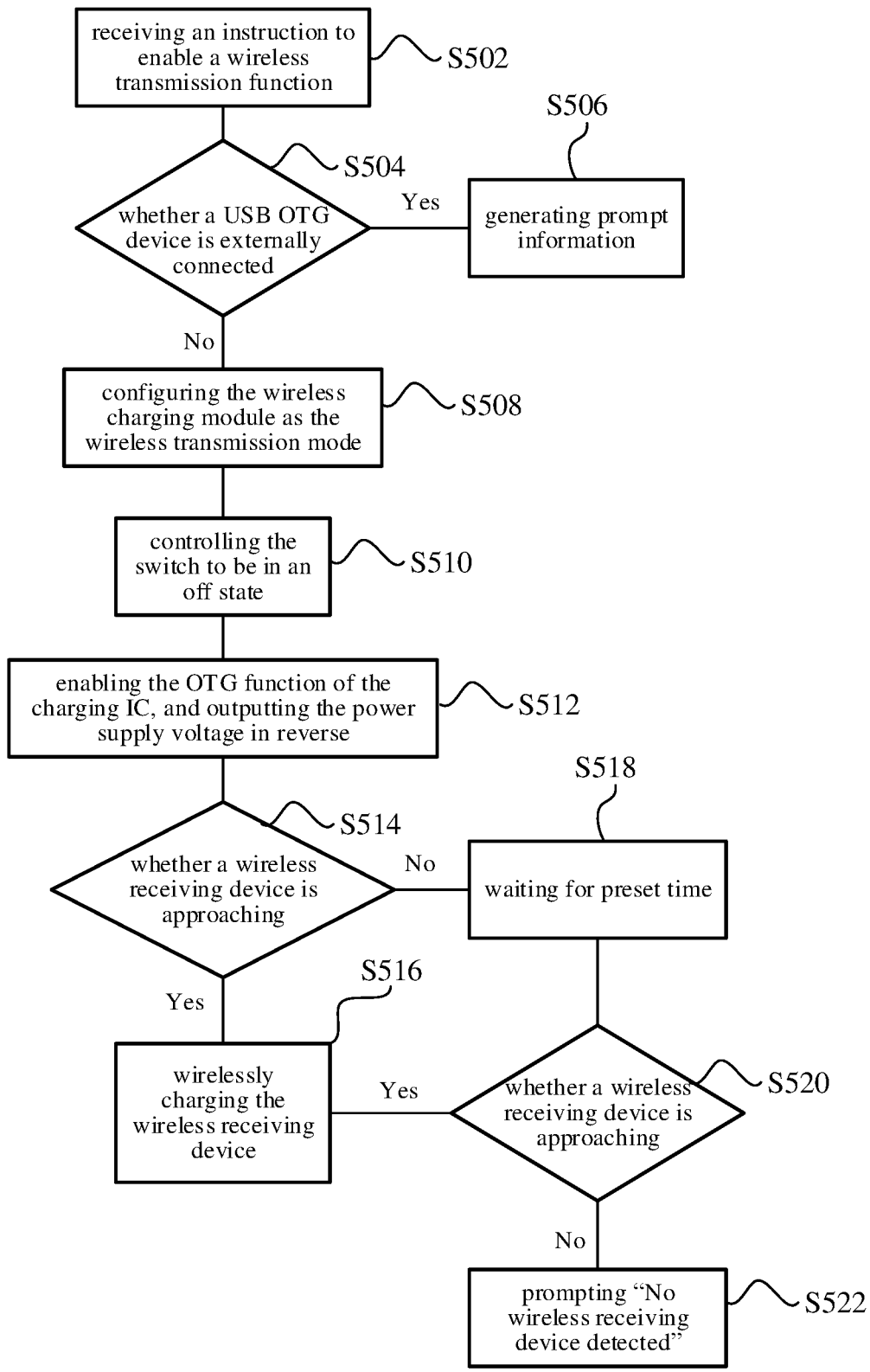
FIG. 5 is a schematic flowchart of a charging control method according to another embodiment of the present disclosure.

FIG. 5 is an example of a specific implementation of the method provided by FIG. 4. FIG. 5 is illustrated by taking an example that the terminal device adopts the structure illustrated in FIG. 3. As illustrated in FIG. 5, the method provided by FIG. 5 may include blocks S502 to S522.

At block S502, an instruction to enable a wireless transmission function is received.

The instruction may be configured to instruct the terminal device to provide wireless charging signals for other terminal devices as a wireless transmitting end, and may be triggered by the user of the terminal device 10.

At block S504, it is determined whether the USB OTG interface is externally connected with a USB OTG device.

If the USB OTG interface is externally connected with a USB OTG device, block S506 is performed; and if the USB OTG interface is not externally connected with a USB OTG device, block S508 is performed.

At block S506, the terminal device is controlled to generate prompt information.

The prompt information may be configured to prompt the user that the USB OTG interface needs to be disconnected from the USB OTG device. The prompt information may be, for example, text information, an indicator signal, or an alarm signal, which is not limited in embodiments of the present disclosure.

At block S508, the wireless charging module is configured as the wireless transmission mode.

Such a block is optional. If the control function of the inverter circuit is implemented by the wireless charging module, the mode of the wireless charging module may be configured as the wireless transmission mode, so that the wireless charging module controls the inverter circuit to convert the power supply voltage provided by the battery into the alternating current signal. If the control function of the inverter circuit is implemented by the inverter circuit itself or by a controller other than the wireless charging module, it is unnecessary to perform block S508.

At block S510, the switch 34 is controlled to be in an off state.

Through block S510, the wireless receiving function of the terminal device 10 may be disabled.

At block S512, the OTG function of the charging IC is enabled, and the power supply voltage is output in reverse.

In detail, the charging IC receives the voltage of the battery, and boosts the voltage of the battery to obtain the power supply voltage. The power supply voltage may be 10V or 15V, for example.

At block S514, it is determined whether a wireless receiving device is approaching.

The wireless receiving device may be another terminal device, for example. There are many determination manners for block S514. For example, the determination may be made based on a distance sensor, or based on a reception condition of the wireless charging signal.

If a wireless receiving device is approaching, block S516 is performed; and if no wireless receiving device is approaching, block S518 is performed.

At block S516, a wireless charging is performed to the wireless receiving device.

At block S518, preset time is waited for.

The preset time may be configured based on experience or actual needs. For example, the preset time may be 15 seconds.

At block S520, it is determined whether a wireless receiving device is approaching.

If a wireless receiving device is approaching, block S516 is performed; and if no wireless receiving device is approaching, block S522 is performed.

At block S522, "No wireless receiving device detected" is prompted.

Optionally, in some embodiments, the terminal device may be reset after sending out the prompt information; or, the terminal device may be reset directly without sending out the prompt information.

In above embodiments, it is possible to implement the embodiments fully or partially by software, hardware, firmware or any other combination. When implemented by software, it is possible to implement the embodiments fully or partially in a form of computer program products. The computer program product includes one or more computer instructions. When the computer program instructions are loaded and executed by the computer, procedures or functions according to embodiments of the present disclosure are fully or partially generated. The computer may be a general-purpose computer, a special-purpose computer, a computer network, or any other programmable device. The computer instructions may be stored in a computer readable storage medium, or may be transmitted from one computer readable storage medium to another computer readable storage medium. For example, the computer instructions may be transmitted from one website, computer, server or data center to another website, computer, server or data center in a wired manner (for example, via coaxial cables, fiber optics, or DSL (digital subscriber line)) or in a wireless manner (for example, via infrared, WiFi or microwave). The computer readable storage medium may be any available medium that are accessible by the computer, or a data storage device such as a server or a data center integrated with one or more available medium. The available medium may be magnetic medium (for example, floppy disk, hard disk and tape), optical medium (for example, DVD (digital video disc)), or semiconductor medium (for example, SSD (solid state disk)).

Those skilled in the art could be aware that, example units and algorithm steps described in combination with embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular uses to implement described functions, which should not be regarded as going beyond the scope of the present disclosure.

In several embodiments provided by the present disclosure, it should be understood that, the disclosed system, device and method may be implemented in other ways. For example, the device embodiments described above are merely illustrative. For example, the units are merely divided according to logic functions, and can be divided in other ways in actual implementation. For example, a plurality of units or components may be combined or may be integrated into another system, or some features may be ignored or not executed. In addition, the mutual coupling or direct coupling or communication connection illustrated or discussed may be via some interfaces, or direct coupling or communication connection of devices or units may be in an electrical, mechanical, or other form.

The units described as separate parts may or may not be physically separated. Parts displayed as units may or may not be physical units, i.e., the parts may be located in one place, or may be distributed on a plurality of network units. Some or all of the units can be selected according to actual needs to achieve purposes of solutions of the embodiments.

Moreover, respective functional units in respective embodiments of the present disclosure may be integrated in one processing unit, or the respective units may be separate physical existence, or two or more units may be integrated in one unit.

Above description is merely specific implementation of the present disclosure. However, the protection scope of the present disclosure is not limited to this. Any change or substitute that is conceivable by those skilled in the art should be in the protection scope of the present disclosure. Thus, the protection scope of the present disclosure should be defined as the protection scope of claims.

What is claimed is:

1. A terminal device, comprising:
a receiving coil, configured to receive a wireless charging signal;
a wireless charging module, configured to perform a wireless charging to a battery based on the wireless charging signal received by the receiving coil;
an inverter circuit, configured to generate an alternating current signal based on a power supply voltage provided by the battery;
a transmitting coil, configured to transmit a wireless charging signal to an outside based on the alternating current signal;
a control module, wherein the control module is a charging integrated circuit configured to receive an output voltage of the wireless charging module and generate a charging voltage of the battery, the charging IC is arranged on a first wireless charging channel of the terminal device, and the first wireless charging channel is referred to as an ordinary wireless charging channel; and
a second wireless charging channel, wherein the second wireless charging channel is at least one of:
configured to charge the battery by using the output voltage of the wireless charging module as the charging voltage of the battery; or
provided with a step-down circuit, the step-down circuit being configured to step down the output voltage of the wireless charging module to obtain an output voltage of the second wireless charging channel and to charge the battery based on the output voltage of the second wireless charging channel, the second wireless charging channel is referred to as a fast wireless charging channel, wherein the charging IC is configured to, in response to receiving an instruction of enabling a wireless transmission function of the terminal device, receive and boost a voltage of the battery, and transmit the boosted voltage to the inverter circuit by using the boosted voltage as the power supply voltage of the inverter circuit.

2. The terminal device of claim 1, further comprising: a universal serial bus (USB) On-The-Go (OTG) interface, wherein the control module is configured to control the battery to provide the power supply voltage to an external USB OTG device through the USB OTG interface.

3. The terminal device of claim 2, wherein one end of the control module is electrically connected to the battery, the other end of the control module is electrically connected to the USB OTG interface and the inverter circuit through a load switch, and the control module controls the battery to provide the power supply voltage for the USB OTG device or for the inverter circuit through the load switch.

4. The terminal device of claim 2, wherein the control module is further configured to:
before controlling the battery to provide the power supply voltage for the inverter circuit, determine whether a USB OTG device is connected to the USB OTG interface; and
in response to determining that a USB OTG device is connected to the USB OTG interface, control the terminal device to generate prompt information for prompting a user to disconnect the USB OTG device from the USB OTG interface.

5. The terminal device of claim 2, wherein the control module is a charging integrated circuit (IC) with an OTG function.

6. The terminal device of claim 5, wherein the charging IC is further configured to:
receive the output voltage of the wireless charging module; and
perform at least one of constant voltage or constant current control on the output voltage of the wireless charging module to generate a charging voltage of the battery.

7. The terminal device of claim 6, further comprising: a detection circuit, configured to detect at least one of the output voltage or an output current of the second wireless charging channel, wherein the wireless charging module is further configured to perform a wireless communication with a wireless charging apparatus based on the at least one of the output voltage or the output current of the second wireless charging channel detected by the detection circuit to adjust a transmitting power of the wireless charging apparatus, such that the at least one of the output voltage or output current of the second wireless charging channel match at least one of a charging voltage or a charging current presently required by the battery.

8. The terminal device of claim 6, further comprising: a detection circuit, configured to detect at least one of a voltage or a current of the second wireless charging channel;
wherein the wireless charging module is further configured to perform a wireless communication with a wireless charging apparatus based on the at least one of the voltage or the current of the second wireless charging channel detected by the detection circuit to adjust a transmitting power of the wireless charging apparatus, such that the at least one of the output voltage or output current of the second wireless charging channel match at least one of a charging voltage or a charging current presently required by the battery.

9. The terminal device of claim 8, wherein the step-down circuit is a BUCK circuit or a charge pump.

10. The terminal device of claim 1, wherein the inverter circuit is a bridge inverter circuit.

11. The terminal device of claim 1, wherein the receiving coil and the transmitting coil are the same coil.

12. A charging control method for a terminal device having a first wireless charging channel and a second wireless charging channel,
wherein the first wireless charging channel is provided with a charging integrated circuit (IC) configured to receive an output voltage of a wireless charging module of the terminal device and generate a charging voltage of a battery, wherein the first wireless charging channel is referred to as an ordinary wireless charging channel,
wherein the second wireless charging channel is at least one of (a) configured to charge the battery by using the output voltage of the wireless charging module as the charging voltage of the battery; or (b) provided with a step-down circuit configured to step down the output voltage of the wireless charging module to obtain an output voltage of the second wireless charging channel and to charge the battery based on the output voltage of the second wireless charging channel, wherein the second wireless charging channel is referred to as a fast wireless charging channel,
the charging control method comprising:
receiving a wireless charging signal;
performing a wireless charging to the battery in the terminal device based on the wireless charging signal received;
generating an alternating current signal based on a power supply voltage provided by the battery;
transmitting a wireless charging signal to an outside based on the alternating current signal; and
controlling the battery to provide the power supply voltage to the inverter circuit, comprising:
in response to receiving an instruction of enabling a wireless transmission function of the terminal device, receiving a voltage of the battery;
boosting the voltage of the battery; and
transmitting the voltage booster to the inverter circuit by using the voltage boosted as the power supply voltage of the inverter circuit.

13. The charging control method of claim 12, further comprising at least one of:
controlling the battery to provide the power supply voltage to an external universal serial bus (USB) On-The-Go (OTG) device through a USB OTG interface of the terminal device; or
controlling the battery to provide the power supply voltage to an inverter circuit for generating the alternating current signal.

14. The charging control method of claim 13, further comprising:
before controlling the battery to provide the power supply voltage for the inverter circuit:
determining whether a USB OTG device is connected to the USB OTG interface; and
in response to determining that a USB OTG device is connected to the USB OTG interface, controlling the terminal device to generate prompt information for prompting a user to disconnect the USB OTG device from the USB OTG interface.

* * * * *